Figure 1:
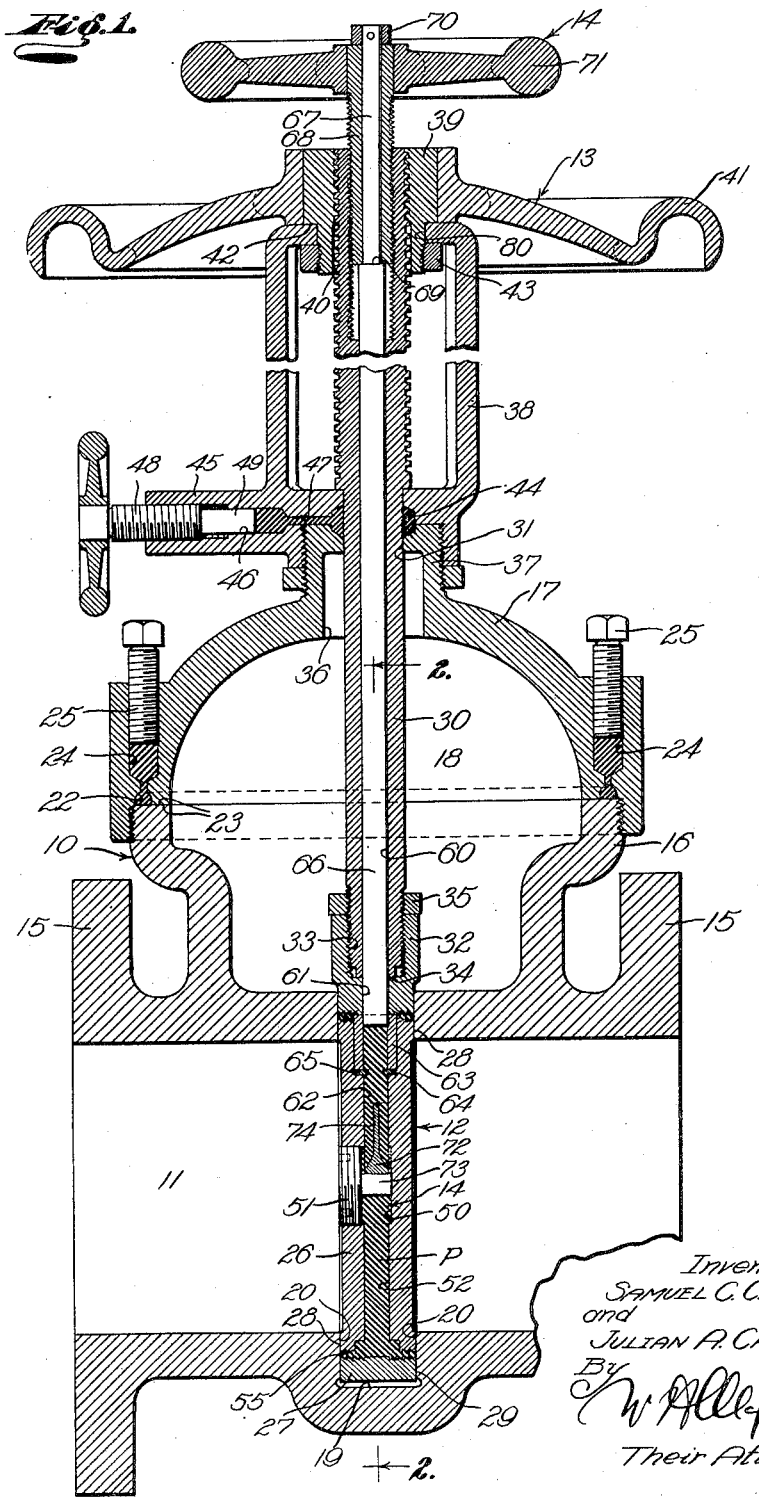

Aug. 31, 1937.  J. A. CAMPBELL ET AL  2,091,671

VALVE

Filed May 25, 1936 2 Sheets—Sheet 1

Inventors
Samuel C. Carter
and
Julian A. Campbell
By
Their Attorney

Aug. 31, 1937.  J. A. CAMPBELL ET AL  2,091,671
VALVE
Filed May 25, 1936  2 Sheets-Sheet 2
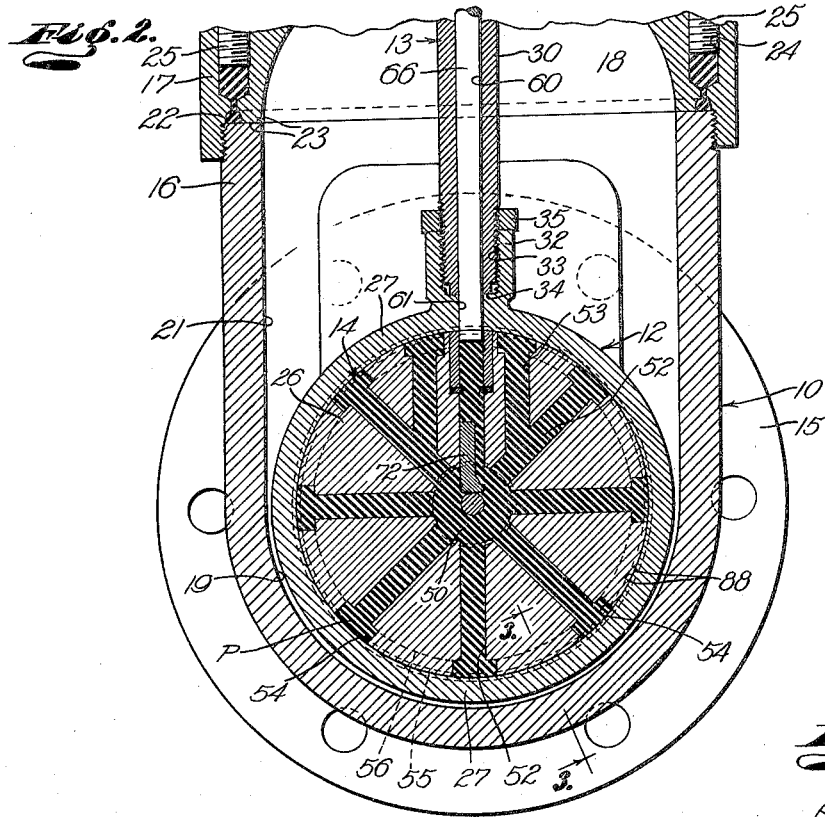
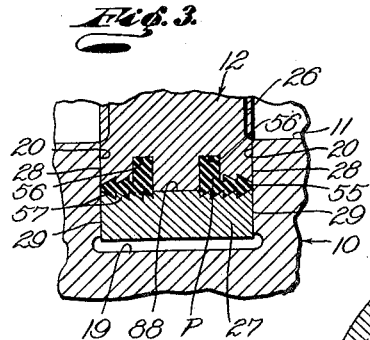
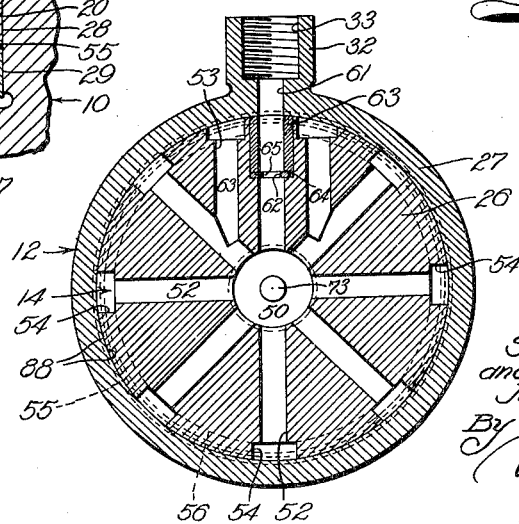
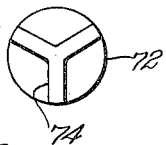
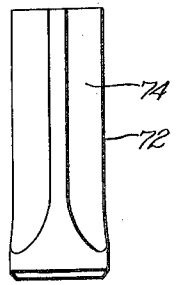
Inventors
SAMUEL C. CARTER
and
JULIAN A CAMPBELL
By
Their Attorney Patented Aug. 31, 1937

2,091,671

UNITED STATES PATENT OFFICE 2,091,671

VALVE

Julian A. Campbell, Long Beach, and Samuel C. Carter, Los Angeles, Calif.

Application May 25, 1936, Serial No. 83,480

11 Claims. (Cl. 251—51)

This invention relates to valves and it is a general object of the invention to provide a practical improved and particularly effective valve.

This application is filed as a continuation in part of our co-pending application entitled Valve, Serial No. 1,636, filed January 14, 1935.

A great many forms of valves have been introduced. Practically all of these prior valves have depended upon direct metal to metal contact between the seat and the closure to effect a seal. The metal to metal seal has proven ineffective, particularly where fluid is handled at high pressures and high temperatures and where penetrating fluids are handled. Valves have been introduced embodying means for supplying lubricant to the metal to metal sealing faces of the closure and seat to overcome the recognized insufficiencies of the metal to metal seal. In actual practice it has been found that the forcing of lubricant to or between the metal to metal sealing faces does not prevent the leakage of fluid or the loss of pressure. The lubricant leaks away, flows away, and is penetrated by the line fluid and, therefore, is of little or no value. Great loss is occasioned by leaking valves and there is often a fire hazard where the leaking fluid is inflammable. Every effort has been made to overcome the insufficiencies of the valves now in use. These efforts to correct the valves employing metal to metal seals have only resulted in increased cost, difficulty in opening and closing the valves and bulky, cumbersome structures.

An object of this invention is to provide a valve capable of maintaining a fluid tight and leak tight seal for an extended period when handling penetrating fluids, fluids at high temperatures and fluids under high pressures.

Another object of this invention is to provide an improved valve than does not employ or depend upon the direct engagement or the metal to metal contact of the seat and closure to effect or maintain a leak tight seal.

Another object of this invention is to provide a valve that utilizes or embodies metallic packing that is normally solid and which forms sealing gaskets between the seats and the faces of the closure when subjected to high internal pressures which packing is impenetrable by and impervious to practically all fluids handled in pipe lines, etc. The present invention employing the metallic, normally solid, gasket forming packing medium completely overcomes the defects and insufficiencies of the typical valves embodying metal to metal seals.

Another object of this invention is to provide a valve of the character mentioned that is formed and constructed in a manner to contain the metallic, normally solid, packing under very high pressures to render it plastic or formable and to provide gaskets between the surfaces of the seat parts and the closure.

Another object of this invention is to provide an improved valve of the character mentioned that provides leak tight seals at both the upstream and the down-stream sides of the closure or gate.

Another object of this invention is to provide a valve that is easy to open and close even under high pressure conditions. When the pressure on the packing in the valve of the present invention is relieved and the valve is opened the packing rubs or wipes against the body seats cleaning them of scale and dirt and providing for free easy operation of the gate.

An important object of the present invention is to provide a valve embodying a gate comprising a solid one-piece block or disc having an internal compression chamber in which the metallic packing may be put under very high super-atmospheric pressures to flow or press outwardly through radiating ports in said disc to form the sealing gaskets between the gate and the seats. In actual operation of the valve provided by this invention the packing material is loaded in the gate under a pressure of twenty thousand (20,000) pounds per square inch, or more, and may be subjected to high pressures as found necessary during the use of the valve to effect the proper seals about the gate. The so-called "lubricated valves" heretofore introduced do not embody compression chambers or reservoirs capable of holding such high pressures and, therefore, cannot employ metallic or normally solid packing such as employed in the valve of the present invention.

Another object of this invention is to provide a valve of the character mentioned having means for preventing the packing from returning or flowing into the gate, even when subjected to very high line pressures.

Another object of this invention is to provide a valve of the character mentioned that forms or provides complete annular fluid tight gaskets between the gate and body seats, that do not wash away or dissolve in the manner of lubricant seals and that are practically impervious to and unaffected by most line fluids.

Another object of this invention is to provide an improved valve of the character mentioned embodying a single control and check valve in the packing port system and straight packing ports with no obstructions, restrictions or sudden changes of direction which might interfere with the flow or movement of the partially plastic and normally solid packing.

The various objects and features of our invention will be fully understood from the following detailed description of a typical preferred form and application of the invention, throughout which description reference is made to the accompanying drawings, in which:

Fig. 1 is a central longitudinal detailed sectional view of the valve provided by this invention showing the closure or gate in the closed position. Fig. 2 is a fragmentary vertical detailed sectional view taken as indicated by line 2—2 on Fig. 1. Fig. 3 is an enlarged fragmentary detailed sectional view taken as indicated by line 3—3 on Fig. 2. Fig. 4 is a central vertical sectional view of the gate removed from the body. Fig. 5 is an enlarged end view of the control and check valve and Fig. 6 is a side elevation of the control and check valve.

The valve provided by this invention includes, generally, a body 10 having a fluid passage 11, a shiftable gate 12, means 13 for shifting the gate 12 between the open and closed positions and packing means 14 associated with the valve 12 for sealing between the gate 12 and the body 10 when the gate is in its closed position across the passage 11.

The body 10 may be varied considerably in design and construction depending upon the size of the pipe line and the mode of installation of the valve. Means is provided on the typical body 10, illustrated, for facilitating its connection in a pipe line. In the case illustrated the body 10 has flanges 15 at its opposite ends adapted to be connected with similar flanges of a conduit or pipe line. The fluid passage 11 of the body 10 may be a straight cylindrical opening. A boss 16 projects from what we will term the upper side of the body 10 to carry a bonnet 17. In practice the bonnet 17 may be threaded on the boss 16. A chamber 18 is provided in the projecting boss 16 and bonnet 17 to receive the gate 12 when it is moved to its open position.

The body 10 is shaped to receive the gate 12 when in its closed position and to provide sealing faces or seats at the opposite sides of the closed gate. A transverse slot or opening 19 intersects the fluid passage 11 and communicates with the inner end of the chamber 18. In accordance with the invention the opening 19 has flat parallel side walls constituting opposed seats 20. The seats 20 may be ground or otherwise finished and are annular to completely surround the fluid passage 11. The side walls of the opening 19 may be relieved or recessed around the seats 20 to receive any scale or dirt that may tend to accumulate on the seats. The lower end of the opening 19 is closed by the integral wall of the body 10. The opening 19 extends upwardly or outwardly to have side parts at the opposite sides of the chamber 18 which form guide-ways 21 for the gate 12.

Means is preferably provided for sealing between the bonnet 17 and the boss 16. While various means may be employed for this purpose we prefer to employ the packing means illustrated in the drawings. As illustrated in the drawings an annular or continuous groove 22 is provided between abutting surfaces 23 of the boss 16 and bonnet 17. One or more bores 24 are provided in the bonnet 17 and have restricted communication with the groove 22. The groove 22 and the inner portions of the bores 24 are occupied by metallic and partially plastic packing of the character described and claimed in our co-pending application entitled Packing material, filed Dec. 21, 1936, Serial No. 117,200. Compression screws 25 are threaded into the bores 24 to maintain the packing under relatively high pressures so that it maintains an effective fluid tight seal at the surfaces 23.

The closure or gate 12 is provided to control or cut off the flow through the passage 11. The gate 12 is movable between a position across the passage 11 and a position clear of the passage where it is within the chamber 18. The construction of the gate 12 is a feature of the invention. In accordance with the invention the gate 12 includes a block or disc 26 and a ring 27 around the disc. The disc 26 is a solid or one-piece member and is comparatively thick to withstand high internal pressures. The opposite sides of the disc 26 are preferably flat and parallel. Annular slightly raised surfaces 28 are provided on the opposite sides of the disc 26 adjacent its periphery. The disc 26 is proportioned for movement through the opening 19 with slightly more than working clearance which clearance is completely blocked at the packing ports by the extrusion of the packing P when under applied pressure as will be hereinafter described.

The outer part or ring 27 of the gate 12 surrounds the disc 26 to carry the same. The ring 27 is comparatively thick and is a one-piece member. The periphery of the ring 27 is preferably cylindrically curved and the interior of the ring 27 is generally cylindrical. The disc 26 and the ring 27 preferably have accurately fitted contacting annular surfaces 88. The surfaces 88 are spaced inwardly from the opposite sides of the gate 12 for the purpose to be hereinafter described. The ring 27 is proportioned to extend to or beyond the outer perimeters of the seats 20 when the gate 12 is in its closed position. The opposite side surfaces 29 of the ring 27 are flat and in the same plane as the surfaces 28 of the disc 26 and, therefore, have the same clearance with the seats 20 as the surfaces 28. It is to be noted that the gate 12 just described may be operated between the seats 20 without binding or wedging against the seats.

The means 13 for operating the gate 12 between its open and closed positions may be varied considerably without departing from the invention. In the particular case illustrated in the drawings the gate 12 is operated by manually operable screw means. The means 13 includes a stem 30 secured to the gate 12 and extending outwardly or upwardly to pass through an opening 31 in the bonnet 17. A lug or boss 32 is provided on the ring 27 of the gate 12 and the inner extremity of the stem 30 is threaded into a socket 33 in the boss. A ground annular face 34 may be provided on the inner end of the stem 30 to contact and seal against the bottom wall of the socket 33. A lock nut 35 may be provided on the stem 30 to clamp against the outer end of the boss 32. A socket 36 may be provided in the outer wall of the bonnet 17 to receive the lock nut 35 and the boss 32 when the gate 12 is in its open position.

A boss 37 projects from the outer side of the bonnet 17 and a carrier or bracket 38 is threaded on the boss 37. An opening 80 in the outer portion of the bracket 38 passes the stem 30 with substantial clearance. A nut 39 is rotatable in the opening 80. The nut 39 and the stem 30 have cooperating threads 40 whereby rotation of the nut 39 effects longitudinal movement of the stem 30. A suitable hand wheel 41 is fixed to the nut 39. The nut 39 is free to rotate in the opening 80 but is held against vertical or longitudinal movement. A shoulder 42 on the nut 39 cooperates with the outer end of the bracket 38 to prevent movement of the nut in one direction. A lock washer or nut 43 is provided on the nut 39 and cooperates with the bracket 38 to prevent movement of the nut 39 in the other direction. It will be apparent how rotation of the nut 39 through the medium of the hand wheel 41 shifts the stem 30 and the gate 12 secured thereto.

Means is preferably provided for sealing around the stem 30 at the outer end of the bonnet 17. An annular space or chamber 44 is provided between the contacting outer end of the boss 37 and the bracket 38 and surrounds the stem 30. A projecting lug 45 on the bracket 38 is provided with a cylindrical opening 46. A port 47 connects the chamber 44 and the opening 46. Metallic packing occupies the chamber 44, the port 47 and the inner portion of the opening 46. This packing may be of the same character as the packing provided in the groove 22. A compression screw 48 is threaded in the outer end of the lug 45 and carries a ram 49. The ram 49 operates in the cylinder opening 46 to place the packing in the chamber 44 under compression whereby it seals about the stem 30.

The packing means 14 for sealing between the gate 12 and the seats 20 is an important feature of the present invention. The packing means 14 provides and maintains a positive pressure-tight and fluid-tight seal at both the up-stream and the down-stream sides of the gate 12. In accordance with the invention the means 14 includes a port system in the gate 12. In the preferred construction illustrated this port system includes a central compression chamber 50 in the disc 26. The chamber 50 is preferably of small diameter relative to the disc 26 and may be in the nature of a central axial socket or bore in the disc. A heavy threaded plug 51 closes the mouth of the bore forming the chamber 50. A multiplicity of outwardly extending or radiating ports 52 communicate with the chamber 50 and extend outwardly to the periphery of the disc 26. The ports 52 may be in the nature of cylindrical bores and may be equally circumferentially spaced. Ports 53 may join the two uppermost ports 52 at points between their ends to extend outwardly to the periphery of the disc 26.

The chamber 50 and the ports 52 and 53 carry metallic packing P which is plastic or formable only at high super-atmospheric pressures. The ports 52 and 53 should be relatively large in diameter to provide for the proper flow or movement of the packing P. It will be noted that the ports 52 and 53 are straight and without abrupt changes in direction. If desired or believed necessary counter-bores or sockets 54 may be provided in the periphery of the disc 26 at the outer ends of the ports 52 and 53. The outer ends of the ports 52 and 53 or the sockets 54 thereof extend through or interrupt the peripheral surface 88 of the disc 26.

The invention provides annular gaps or grooves 55 between the periphery of the disc 26 and the internal surface of the ring 27 to carry packing P for sealing with the seats 20. The grooves 55 are from one thirty-second ($\frac{1}{32}$) of an inch to one sixteenth ($\frac{1}{16}$) of an inch in width or radial extent and are annular or continuous to contain annular bodies of packing P. To insure ample communication between the ports 52 and 53 and the grooves 55 it is preferred to provide a relatively deep annular groove 56 in the periphery of the disc 26 at each side of its surface 88. The grooves 56 communicate with the sockets 54 and communicate with the grooves 55 throughout their circumferences.

In accordance with the invention the packing grooves 55 are shaped to prevent undesirable return or inflow of the packing P. Annular wickers or teeth 57 are provided on the inner and outer walls of the grooves 55. The teeth 57 on the inner walls of the grooves 55 are directly opposite those on the outer walls of the grooves. The teeth 57 have abrupt outer surfaces facing in the direction of the seats 20 and have inclined inner surfaces. The inclined inner surfaces of the teeth 57 allow relatively free outflow or movement of the packing P whereas the abrupt outer surfaces of the teeth 57 effectively check and prevent the return flow of the packing.

It is to be noted that the gate 12 embodying the solid disc 26 and the ring 27 may be readily provided with the ports 52 and 53 and the packing grooves 55 and 56. The ports 52 and 53 may be bored in the disc 26 prior to the assembly of the discs in the ring 27. In a like manner the periphery of the disc 26 and the interior of the ring 27 may be readily provided with grooves before the assembly of the gate which grooves form the teeth 57 and the grooves 55 and 56. The ports 52 and 53 and the grooves 55 and 56 thus provided in the gate 12 do not weaken the gate and the gate is capable of withstanding very high internal pressures.

The above described port system of the gate 12 is occupied by the metallic and partially plastic packing P. The packing P is normally non-fluid and non-plastic and is only partially plastic and capable of limited flow only when under very high pressures. It is preferred to employ as the packing P a packing material of the character described in the above-identified co-pending application. The packing therein described is in the form of pellets and composed of about forty percent (40%) ground lead, about forty percent (40%) shot of thirty-two thousandths (.0032) of an inch in diameter, about twenty percent (20%) graphite, a small quantity of oil and a small quantity of ground rosin thoroughly mixed by heating and then pressed into the pellets. The shot is rolled or flattened into the form of flakes or discs of from five to ten thousandths (.005 to .010) of an inch in thickness before being mixed with the other ingredients. This packing material has been found to be practically impervious to and impenetrable by practically all fluids and to be partially plastic when under very high super-atmospheric pressures so that it may be made to flow and form the tight effective seals between the seats 20 and the gate 12.

Being conformable under very high pressures the packing P at the mouths of the grooves 55 may be pressed and distorted against the seats 20 to form gaskets between the seats and the opposing surfaces of the gate 12. These gaskets of the packing P being formed and maintained under high internal pressure in the gate 12 are fluid tight, pressure tight and capable of resisting the leakage or passage of fluid under high line pressures. The packing P in the port system of the gate 12 is a solid body or mass when under pressure as distinguished from oils, greases, etc. which are liquid even under high superatmospheric pressures. The metallic and only partially plastic or formable packing P is insoluble and unaffected by most fluids handled in valves of the class provided by the invention. The packing P has a relatively high co-efficient of friction and the teeth 57 in the grooves 55 operate to prevent the return of the almost-solid packing even though very high pressures be handled in the pipe line or conduit.

To condition the gate 12 for installation in the valve the packing P is filled in or loaded in the port system of the gate under a pressure of about twenty thousand pounds per square inch for the gate of a six inch valve, and at proportionately high pressures in the gates of larger valves. It has been found practical to load the packing P in the gate 12 by means of a compressor or ram. At this point it is to be noted that the solid block like disc 26 of the gate 12 and the heavy ring 27 are capable of containing the packing P at twenty thousand pounds pressure, and more, without rupturing or distorting. The ports 52 and 53 and the grooves 55 and 56 are positioned and related to minimize the possibility of rupture or distortion of the gate by high internal pressures. The gate 12 of the valve is thus fully distinguished from the closures of prior valves which are incapable of withstanding internal pressures of the magnitude referred to above.

The invention provides means for controlling the packing P and for maintaining proper pressures on the packing to effect the seals between the gate 12 and the body seats 20. The valve stem 30 is tubular having a central longitudinal opening 60 extending through it from one end to the other. An opening 61 is provided in the ring 27 in register with the opening 60. A radial port 62 is provided in the disc 26 in axial alignment with the openings 60 and 61. A liner or bushing 63 is arranged in the outer portion of the port 62. A shoulder 64 is provided on the wall of the port 62 adjacent the inner end of the bushing 63. A stop ring 65 of less internal diameter than the bushing 63 is provided between the shoulder 64 and the inner end of the bushing 63. The means for compressing the packing P includes a plunger 66 extending longitudinally through the opening 60 in the stem 30. The plunger 66 accurately fits the bushing 63. The port 62 and the inner portion of the bushing 63 are occupied by the packing P. The lower or inner end of the plunger 66 is adapted to be moved against the packing P to compress the same.

Means is provided for operating the packing compressing plunger 66. The plunger 66 is provided at its outer end with a spindle 67 of reduced diameter. A sleeve 68 is rotatable on the spindle 67 and is threaded in the stem 30. A shoulder 69 at the inner end of the spindle 67 holds the sleeve 68 against inward movement. A nut 70 is fixed to the outer end of the spindle 67 to prevent outward movement of the sleeve 68. A suitable hand wheel 71 is fixed to the sleeve 68. The sleeve 68 may be rotated by means of the hand wheel 71 to impart longitudinal movement to the plunger 66 for the purpose of putting the packing P under compression or for relieving the pressure on the packing.

The invention preferably includes a control and check valve 72 in the port 62 and the chamber 50. The valve 72 may be a simple one-piece member disposed longitudinally in the port 62 to extend into the chamber 50. A pin 73 is provided on the inner side of the plug 51 and is engageable by the valve 72 to limit the inward travel of the valve. The stop ring 65 is adapted to limit the outward travel of the valve 72. The valve 72 floats in or moves with the metallic packing P. The valve 72 may normally rest on or engage the pin 73. When the actuating pressure on the packing P is relieved by outward movement of the plunger 66 the packing may tend to flow outwardly through the port 62. When this occurs the valve 72 moves outwardly with the packing and seals off the inner end of the port 62. Longitudinal grooves 74 are provided in the valve 72. The grooves 74 terminate above the lower end of the valve leaving a continuous or cylindrical inner end portion. When the valve 72 is moved outwardly with the packing P as described above this continuous cylindrical inner portion of the valve moves into the inner end of the port 62 and thus cuts off outward flow of the packing.

It is believed that the operation of the valve provided by this invention will be readily understood from the foregoing detailed description. Assuming that the gate 12 is in the closed position illustrated in Figs. 1, 2 and 3 of the drawings the packing means 14 may be operated to provide fluid tight and pressure tight seals at both sides of the gate. To actuate the packing means 14 the hand wheel 71 is rotated to force the plunger 66 inwardly against the packing P in the bushing 63. This, of course, places the entire body of packing P in the port system of the gate under pressure. The plunger 66 may be operated to put the packing P under sufficient pressure to cause it to flow or be distorted to the extent that it moves out through the mouths of the grooves 55 against the seats 20. When pressure conditions make it advisable the packing 20 may be put under sufficient pressure to be forced outwardly through the grooves 55 to the extent that it provides or forms sealing flanges which seal between the seats 20 and the surfaces 28 and 29 of the gate. These gaskets being of metallic packing are impervious to and impenetrable by the fluid handled in the pipe line and are operable to resist high pressures in the pipe line. The wickers or teeth 57 in the grooves 55 operate to prevent a return or inward movement of the packing P so that the packing or the flanges on the packing may remain in tight sealing contact with the seats 20 and the surfaces 28 and 29 of the gate indefinitely. If found necessary the plunger 66 may be shifted inwardly from time to time to insure the maintenance of the proper sealing action of the packing P.

It is to be noted that the packing P at the mouths of the grooves 55 forms dependable fluid tight seals at both the upstream and the downstream side of the gate 12. As the packing P forced outwardly through the grooves 55 under high pressures forms the seals between the seats 20 and the gate 12, it is not essential that the gate have metal to metal engagement or direct contact with the seats. The packing P, as described above, is preferably metallic and normally solid and is only capable of flow or distortion when under very high pressures. These characteristics of the packing P render it particularly effective in providing and maintaining pressure-tight and fluid-tight seals between the gate and the body seats 20 under practically all conditions of operation.

When it is desired to open the valve the hand wheel 71 may be rotated to move the plunger 66 outwardly and thus relieve to some extent the pressure on the packing P. As above described, the valve 72 operates to automatically prevent or at least limit outward flow of the packing P from the port system. When the pressure on the packing P has been relieved the hand wheel 41 may be rotated to move the gate 12 to its open position. As the seats 20 are parallel the gate 12 may be operated between its open and closed positions with a minimum of effort. The packing P at the mouths of the grooves 55 may engage or wipe against the seats 20 to automatically clean the seats during movement of the gate 12 so that tight positive seals are assured when the valve is again closed. When it is desired to replenish or add to the supply of packing P, the plunger 66 is first removed from the valve. This may be done when the valve is under very high line pressures without leakage or loss of pressure due to the fact that the packing P is a solid and does not flow back or wash away in the line fluid. Following the removal of the plunger 66 packing P, preferably in the form of a stick, is inserted in the opening 60 and the plunger is replaced and tightened down to put the packing under pressure.

Having described only a typical preferred form and application of our invention, we do not wish to be limited or restricted to the specific details herein set forth, but wish to reserve to ourselves any variations or modifications that may appear to those skilled in the art or fall within the scope of the following claims:

Having described our invention, we claim:

1. A valve including, a body having a fluid passage and a seat around the passage, a gate in the body movable between a position across the passage and an open position, the gate comprising a disc having an internal chamber and ports communicating with the chamber, and a ring on the periphery of the disc, there being a space between the periphery of the disc and the internal surface of the ring communicating with the ports and open at a side of the disc to oppose the seat when the gate is in the closed position, the chamber, ports and space being adapted to contain packing material, and means for placing the packing material under compression to seal against the seat.

2. A valve including, a body having a fluid passage and a seat around the passage, a gate in the body movable between a position across the passage and an open position clear of the passage, the gate comprising an inner member having an internal chamber and ports radiating from the chamber, an annular outer member engaging about the periphery of the inner member, there being an annular space groove between the periphery of the inner member and the internal surface of the outer member communicating with the ports and open at a side of the assembly of the members to oppose the seat when the gate is in the closed position, the chamber, ports and groove being adapted to contain packing material, and means for subjecting the packing material to compression to seal with the seat.

3. A valve comprising, a body having a fluid passage and spaced seats around the passage, a gate in the body movable to a position between the seats, the gate including an inner member having an internal chamber, and ports radiating from the chamber, and an outer member surrounding the inner member and bearing on the periphery of the inner member, there being annular grooves between the opposing surfaces of said members open at opposite sides of the gate to oppose the seats when the gate is in said position, solid packing material in the chamber, ports and grooves partially plastic under compression, and means for putting said packing material under compression to seal with the seats.

4. A valve comprising, a body having a fluid passage and spaced seats around the passage, a gate in the body movable to a position between the seats, the gate including an inner member having an internal chamber, a cylinder opening communicating with the chamber, and ports radiating from the chamber, and an outer member surrounding the inner member, there being annular grooves between the periphery of the inner member and the internal surface of the outer member open at opposite sides of the gate to oppose the seats when the gate is in said position, packing material in the chamber, ports and grooves, and means for putting said packing material under compression to seal with the seats, said means including a plunger operable in the opening.

5. A valve including, a body having a fluid passage and a seat around the passage, a gate in the body movable between a position across the passage and an open position clear of the passage, the gate comprising a disc like inner member having an internal chamber and ports radiating from the chamber, an outer member engaging around the inner member, there being an annular space groove between the members communicating with the ports and opposing the seat when the gate is in the closed position, packing material in the chamber, ports and groove plastic only under high compression, a tubular stem secured to the outer member to shift the gate, said inner member having a cylinder opening communicating with the chamber, and a plunger extending through the stem and operable in the cylinder opening to put the packing material under compression to seal with the seat.

6. A valve including, a body having a fluid passage and a seat around the passage, a gate in the body movable between a position across the passage and an open position clear of the passage, the gate comprising a disc having an internal chamber and ports extending outwardly from the chamber, and a ring on the periphery of the disc, there being a space between the disc and the ring communicating with the ports and opposing the seat when the gate is in the closed position, the chamber, ports and space being adapted to contain packing material operable to seal against the seat at the mouth of said space, a tubular stem secured to the ring for shifting the gate, the disc having a cylinder opening communicating with the chamber, and a plunger extending through the stem and operable in the cylinder opening to put the packing material under compression.

7. A gate for a valve including, a disc having an internal chamber, and a port extending outwardly from the chamber to the periphery of the disc, a ring arranged on the periphery of the disc, there being an annular open groove between the periphery of the disc and the internal surface of the ring communicating with said port and open at a side of the gate, and packing in the chamber, port and groove.

8. A gate for a valve including, a disc having an internal chamber, a cylinder opening communicating with the chamber, and a port extending from the chamber to the periphery of the disc, a ring on the periphery of the disc, there being a space between the periphery of the disc and the interior of the ring communicating with the port and open at one side of the gate, and packing loaded in the chamber, port and space under pressure.

9. A gate for a valve including, an integral disc having an internal chamber, a cylinder opening communicating with the chamber, and a port extending outwardly from the chamber, a ring engaging around the disc, there being a space between the periphery of the disc and the interior of the ring communicating with the port and open at a side of the gate, and teeth on the walls of said space for preventing the in-flow of packing therein.

10. In a valve, a gate including, an integral disc having a substantially central chamber, a cylinder opening communicating with the chamber, and ports radiating from the chamber to the periphery of the disc, a cylinder liner in said opening, a ring surrounding the disc and engaging its periphery, there being spaces between the periphery of the disc and the interior of the ring communicating with the ports and open at the sides of the gate, and a body of sealing material loaded in the chamber, cylinder opening, ports and spaces under high pressure.

11. In a valve, a gate including, a disc having a substantially central chamber, a cylinder opening communicating with the chamber, ports radiating from the chamber to the periphery of the disc, and grooves in its periphery communicating with the ports, and a ring surrounding the disc and engaging its periphery, there being spaces between the periphery of the disc and the internal surface of the ring each communicating with a groove and each open at a side of the gate, the chamber, ports, grooves and spaces being adapted to receive packing material.

JULIAN A. CAMPBELL.
SAMUEL C. CARTER.